(12) United States Patent
Iwashima (10) Patent No.: US 8,028,922 B2
(45) Date of Patent: Oct. 4, 2011

(54) ELECTRONIC DEVICE HAVING CARD READER AND METHOD OF SUPPLYING POWER TO CARD READER

(75) Inventor: Yasuhiro Iwashima, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 12/697,314

(22) Filed: Feb. 1, 2010

(65) Prior Publication Data

US 2010/0193586 A1    Aug. 5, 2010

(30) Foreign Application Priority Data

Feb. 4, 2009  (JP) ................................ 2009-023789

(51) Int. Cl.
*G06K 7/00* (2006.01)
(52) U.S. Cl. ........ 235/479; 235/441; 235/475; 235/483; 235/492; 235/486; 235/380
(58) Field of Classification Search .................. 235/479, 235/441, 475, 483, 492, 486, 380
See application file for complete search history.

(56) References Cited

U.S. PATENT DOCUMENTS

| | | | | |
|---|---|---|---|---|
| 6,473,728 | B1 * | 10/2002 | Tognazzini | 704/3 |
| 6,581,122 | B1 * | 6/2003 | Sarat | 710/301 |
| 2002/0060242 | A1 * | 5/2002 | Hayashida | 235/379 |
| 2003/0212894 | A1 * | 11/2003 | Buck et al. | 713/184 |
| 2003/0217298 | A1 * | 11/2003 | Oh-Yang et al. | 713/300 |
| 2004/0193928 | A1 * | 9/2004 | Shuto et al. | 713/300 |
| 2005/0026680 | A1 * | 2/2005 | Gururajan | 463/25 |
| 2008/0229132 | A1 | 9/2008 | Suga et al. | |
| 2008/0256626 | A1 * | 10/2008 | Masui | 726/20 |
| 2008/0263655 | A1 * | 10/2008 | Muto | 726/16 |
| 2009/0300733 | A1 * | 12/2009 | Inomata et al. | 726/5 |
| 2010/0013631 | A1 * | 1/2010 | Laackmann et al. | 340/540 |
| 2010/0067038 | A1 * | 3/2010 | Aoki | 358/1.14 |

FOREIGN PATENT DOCUMENTS

JP    2005-278110    10/2005

* cited by examiner

*Primary Examiner* — Allyson Trail
(74) *Attorney, Agent, or Firm* — Gerald E. Hespos; Michael J. Porco (57) ABSTRACT

An electronic device includes: a card reader into which a card is inserted and which reads out information carried on the card; a power supply unit which supplies power to the card reader; a detection unit which detects the insertion of a card into the card reader and the ejection of a card from the card reader; and a control unit which controls the power supply unit. When the detection unit detects the insertion of a card, the control unit causes the power supply unit to start the supply of power to the card reader, and when the detection unit detects the ejection of the inserted card, the control unit causes the power supply unit to shut off the supply of power to the card reader.

15 Claims, 8 Drawing Sheets

ELECTRONIC DEVICE HAVING CARD READER AND METHOD OF SUPPLYING POWER TO CARD READER

BACKGROUND OF THE INVENTION

1. Field of the Invention

The present invention relates to an electronic device capable of supplying power to a card reader, and more particularly to an optimal electronic device for reducing power consumption.

2. Description of the Background Art

Currently, reduction of power consumption is generally required in electronic devices. Similarly, reduction in power consumption is also demanded in electronic devices having a card reader for IC cards or magnetic cards (for example, an image forming apparatus). Depending on the specifications of the card reader, a card reader needs to be connected by USB (Universal Serial Bus), and therefore in order to reduce the power consumption of the card reader, it is necessary to reduce the power supplied from the USB. An image forming apparatus which can be transferred to a power saving standby state in order to reduce power consumption has been disclosed in common art references.

However, when a card reader is provided in a conventional image forming apparatus via a USB connection, it is necessary for the card reader to be on (in a powered state) at all times, in order to be able to determine whether or not a card has been inserted, at all times. Therefore, even if it is possible to switch off the power source of the motor, and the like, provided in the image forming apparatus, it is not possible to switch off the power supply to the card reader. Consequently, if a card reader is provided in a conventional image forming apparatus, then it is not possible to reduce the power consumption corresponding to the card reader.

The current flowing through a card reader receiving a supply of power via a USB connection is approximately 50 mA. If the frequency of use of the card reader is low, then it is necessary to for the power supply to be on at all times for the card reader which has a low frequency of use, and this poses a problem from the viewpoint of reducing the power consumption.

SUMMARY OF THE INVENTION

It is an object of the present invention to provide an electrical device which is capable of reducing power consumption in a time period where a card reader is not used (card detection standby time).

The electronic device relating to one aspect of the present invention which achieves this object includes: a card reader into which a card is inserted and which reads out information carried on the card; a power supply unit which supplies power to the card reader; a detection unit which detects the insertion of a card into the card reader and the ejection of a card from the card reader; and a control unit which controls the power supply unit; the control unit causing the power supply unit to start the supply of power to the card reader when the detection unit detects the insertion of a card, and causing the power supply unit to shut off the supply of power to the card reader when the detection unit detects the ejection of the inserted card.

The method of supplying power to a card reader relating to a further aspect of the present invention is a method of supplying power to a card reader which receives the insertion of a card and reads out information carried on the card, including the steps of: waiting for the detection of an operation of inserting a card into the card reader, in a state where a card has not been inserted into the card reader; causing a power supply unit which supplies power to the card reader to start the supply of power to the card reader, when the insertion of a card into the card reader is detected; waiting for the detection of an operation of ejecting the card from the card reader, in a state where the card has been inserted into the card reader; and stopping the supply of power to the card reader by the power supply unit when the ejection of the card from the card reader is detected.

DETAILED DESCRIPTION OF THE PREFERRED EMBODIMENTS (Image Forming Apparatus)

Figure 1:
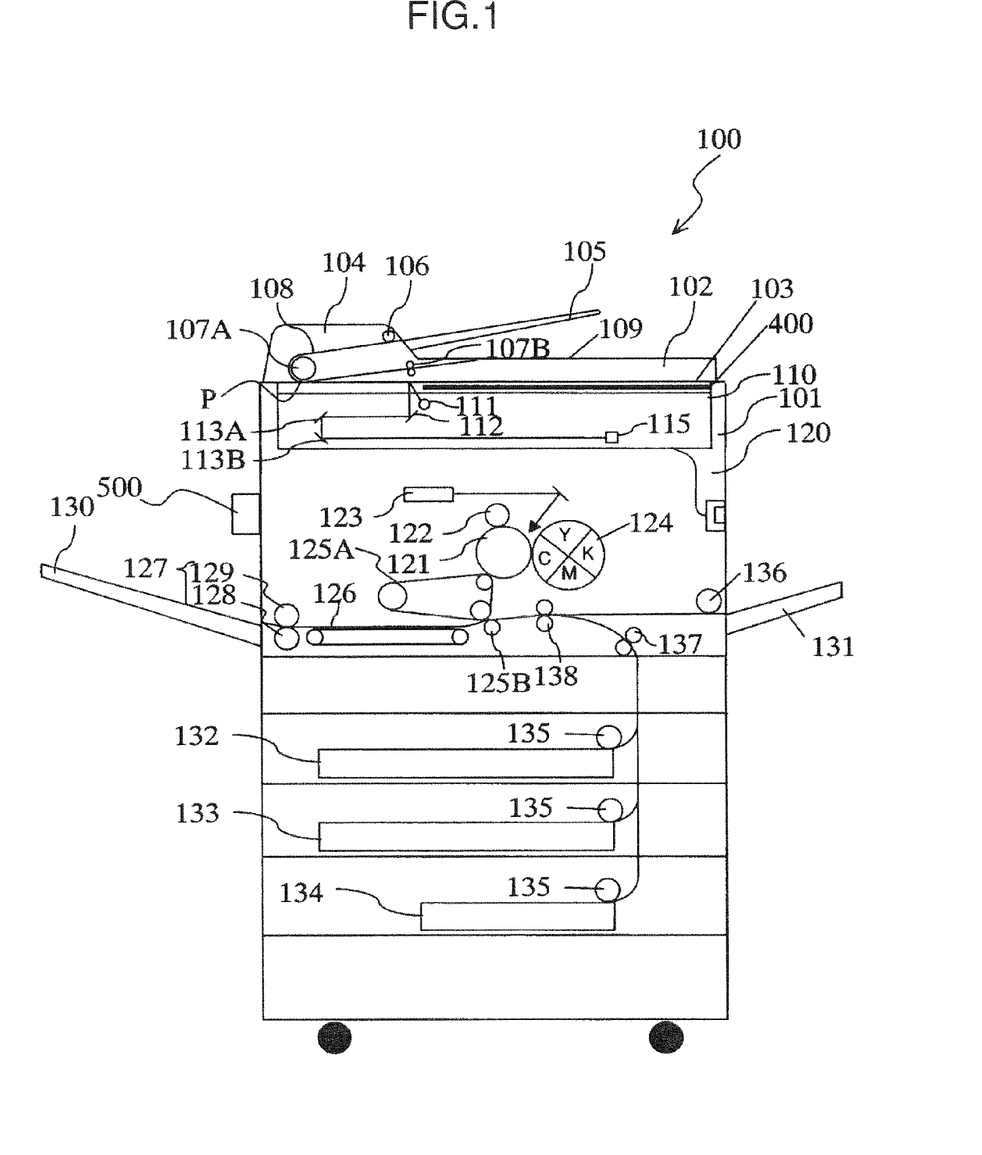
FIG. 1 is a diagram showing the general composition of an electronic device (image forming apparatus) relating to an embodiment of the present invention.

Below, the basic processing of a copying service in an image forming apparatus is described as one example of the electronic device according to the present invention. The image forming apparatus relating to the embodiment of the present invention corresponds to a digital transfer machine, a printer, a composite machine including a printer, copier, scanner, fax, etc., and the like, and functions as an image forming apparatus providing a copying service, scanner service, fax service, printer service, and the like. Here, a composite machine is taken as an example of an image forming apparatus. FIG. 1 is a general schematic drawing of a composite machine 100. Here, detailed description of the respective sections which are not directly related to the present invention is omitted.

The composite machine 100 includes a main body 101 and a platen cover 102 which is installed on top of the main body 101. An original document bed 103 is provided on the upper surface of the main body 101, and the surface of the original document bed 103 is opened and closed by the platen cover 102. An automatic original document feed apparatus 104, a mounting tray 105 and a paper output tray 109 are provided in the platen cover 102.

When a user executes printing of an original document, for example, by using the composite machine 100, the user places an original document on the original document bed 103 or the mounting tray 105, and inputs a printing instruction to the operating section 400 which is provided in the vicinity of the original document bed 103. Upon the inputting of this instruction, printing is carried out by the operation of the various sections (drive units) which are described below.

Figure 2:
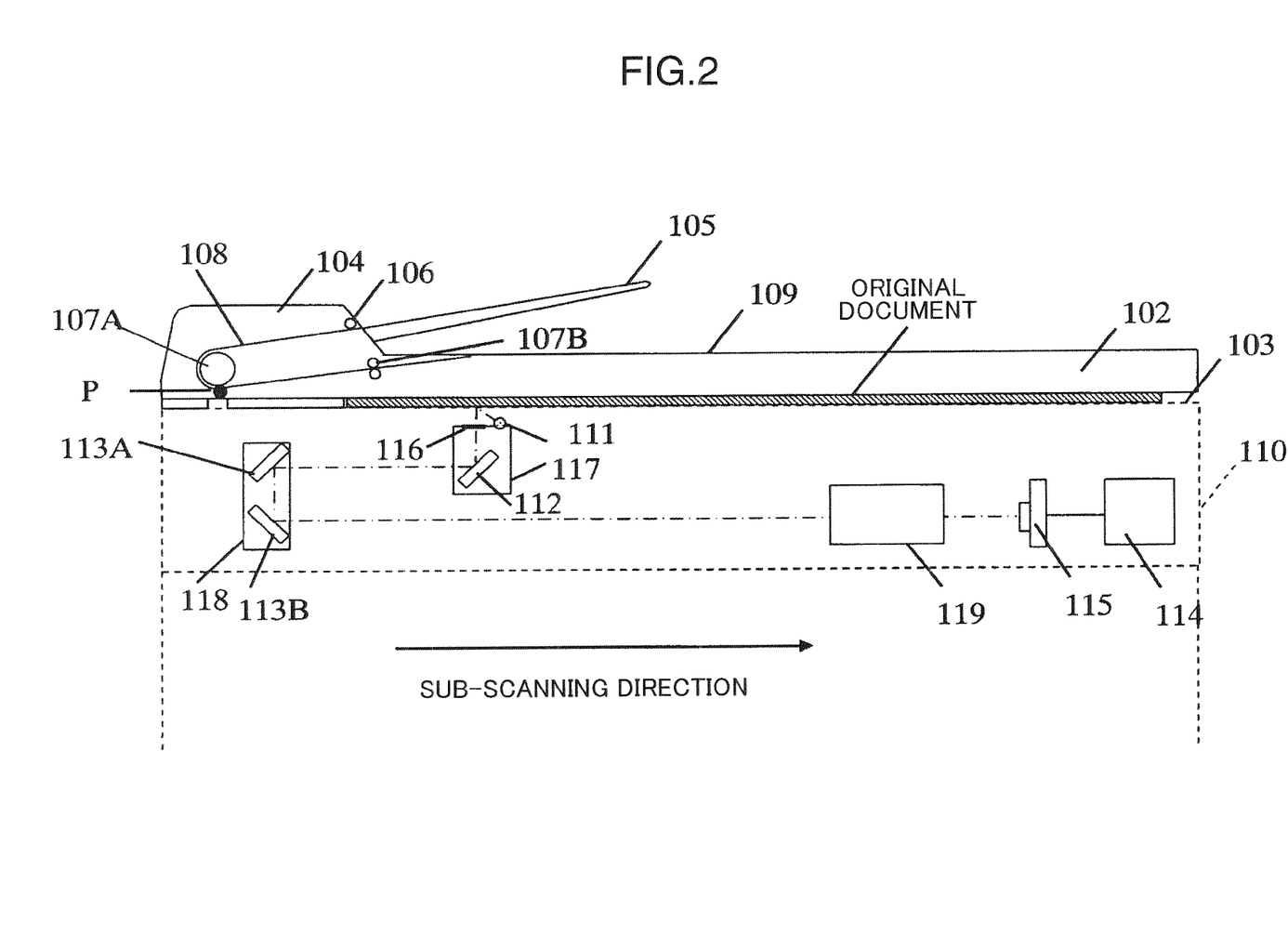
FIG. 2 is a drawing showing the composition of a reading unit of an image forming apparatus.

A reading unit 110 is provided below the original document bed 103, and a detailed view thereof is shown in FIG. 2.

The reading unit 110 includes a first movement carriage 117 and a second movement carriage 118. The first movement carriage 117 includes a light source 111 which is long in a main scanning direction for illuminating the original document bed 103, a slit 116 for selecting passing light from the original document bed 103, and a mirror 112 for guiding the light from the original document bed 103. The second movement carriage 118 includes mirrors 113A and 113B for re-reflecting the reflected light from the first movement carriage 117. The reading unit 110 also includes a lens group 119 which optically corrects the light guided by the mirrors 113A and 113B, an imaging element 115 which receives light corrected by the lens group 119, and an image data generating unit 114 which converts the light received by the imaging element 115 into an electrical signal and carries out corrections and compensations electrically, and the like, according to requirements.

When an original document on the automatic original document feed apparatus 104 is read out, the light source 111 moves to a position where it can irradiate onto the reading position P and then emits light. The light from the light source 111 passes through the original document bed 103, is reflected by the original document passing the reading position P, and is then guided to the imaging element 115 by the slit 116, the mirrors 112, 113A, 113B, and the lens group 119. The imaging element 115 converts the received light to an electrical signal and transmits this to the image data generating unit 114.

The light received by the imaging element 115 is input as analog electrical signals for R (red), G (green) and B (blue) to the image data generating unit 114, which "digitizes" the signals, in other words, converts the signals from analog to digital. Moreover, in the image data generating unit 114, the successively converted digital signals are taken as unit data, and by correcting or compensating these units data, image data consisting of a plurality of unit data is generated.

Furthermore, when an original document mounted on the original document bed 103 is read out by the reading unit 110, the first carriage 117 is moved in the sub-scanning direction while the light source 111 emits light. The second movement carriage 118 moves in the direction of the image element 115 at ½ the speed of the first movement carriage 117, in order to set a uniform light path length from the light source 111 to the imaging element 115.

The imaging element 115 converts the light from the original document positioned on the original document bed 103 to an electrical signal, on the basis of the light guided by the mirrors 112, 113A and 113B. The image data generating unit 114 generates image data on the basis of this electrical signal.

A print unit 120 for printing image data is provided below the reading unit 110 of the main body 101. Images which can be printed by the print unit 120 are images generated by the image data generating unit 114 as described above, and images sent together with an image formation instruction from a network, via a communications cable which is connected to the composite machine 100.

An electrophotographic method is used as the printing method employed by the print unit 120. In other words, a method is employed in which a photosensitive drum 121 is uniformly charged by a charger 122, the photosensitive drum 121 is then irradiated with a laser 123 to form a latent image on the photosensitive drum 121, toner is applied to the latent image by a developer 124 to form a visible image, and the visible image is then transferred to paper by a transfer roller 125B.

The paper onto which the visible image has been printed is loaded into a paper supply tray, such as a manual tray 131, a paper supply cassette 132, 133, 134, or the like, and is supplied to the print unit 120.

When the print unit 120 carries out printing, one sheet of paper is taken up from any one of the paper supply trays by a pick-up roller 135, and the paper thus taken up is conveyed between an intermediate transfer belt 125A and a transfer roller 125B by a conveyance roller 137 and a resist roller 138. In taking up the paper, paper which is loaded in the manual feed tray 131 may also be taken up by a pick-up roller 136 for the manual feed tray.

The print unit 120 transfers the visible image on the intermediate transfer belt 125A to paper which has been supplied between the intermediate transfer belt 125A and the transfer roller 125B, and then sends the paper to the fixing apparatus 127 by means of the conveyance belt 126, in order to fix the visible image onto the paper. The fixing apparatus 127 includes a heating roller 128 having an in-built heater, and a pressurizing roller 129 which is pressed against the heating roller 128 with a prescribed pressure. When paper passes between the heating roller 128 and the pressurizing roller 129, the visible image is fixed onto the paper by the heat and the pressing force acting on the paper. The print unit 120 then discharges the paper which has passed through the fixing apparatus 127, to a paper output tray 130.

The foregoing is the basic process of a copying service in the composite machine 100. The composite machine 100 provides a user with other functions, such as a facsimile transmission and reception function, a print function, a scanning function, a post-processing function, a memory function, and the like, by operating the various sections described above (reading unit 110, print unit 120) suitably in a coordinated fashion. The composite machine 100 relating to the present embodiment includes a card reader 500, described hereinafter, which is used to recognize the user. Power is supplied to this card reader 500 from a power supply unit provided in the composite machine 100.

Figure 3:
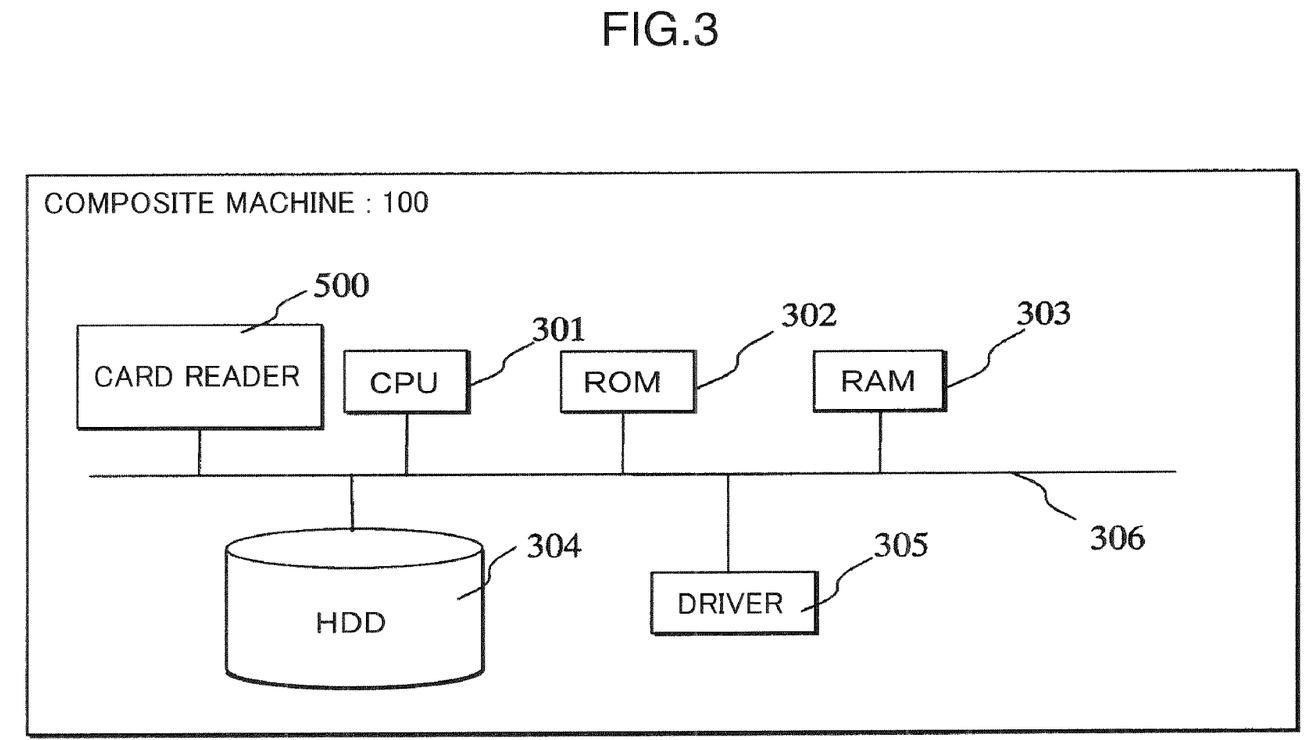
FIG. 3 is a drawing showing the hardware composition of a control system of an image forming apparatus.

Next, the hardware composition of the control system of the composite machine 100 will be described with reference to FIG. 3. FIG. 3 is a general schematic drawing of the control system hardware of the composite machine 100. Here, detailed descriptions of the respective sections which are not directly related to the present invention are omitted.

The control circuit of the composite machine 100 includes a CPU (Central Processing Unit) 301, a ROM (Read Only Memory) 302, a RAM (Random Access Memory) 303, a HDD (Hard Disk Drive) 304 and a driver 305 corresponding to the respective drive sections, and these various elements are mutually connected by means of an internal bus 306. The CPU 301 uses, for example, the RAM 303 as a work area and executes a program stored in the ROM 302, the HDD 304, or the like, and the CPU 301 receives data and instructions from a driver 305 and an operating unit 400 on the basis of the results of executing the program, and controls the operation of the respective drive sections shown in FIG. 1 and FIG. 2 above. The card reader 500 is connected to the internal bus 306 of the control circuit of the composite machine 100 by a USB connection.

Figure 4:
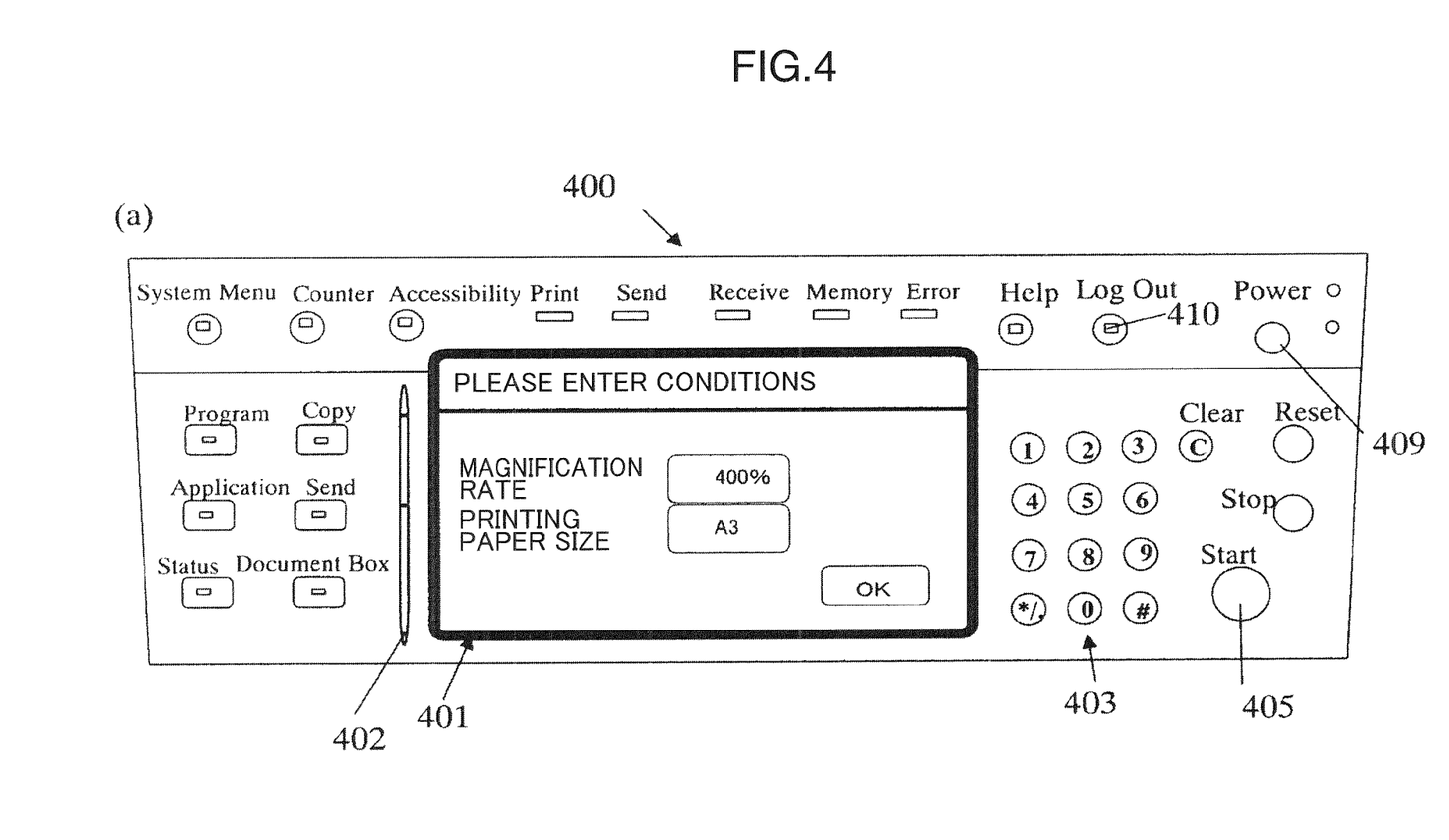
FIG. 4 is a drawing showing an operating unit of an image forming apparatus.

FIG. 4 is a diagram showing one example of the external appearance of the operating unit 400 provided in the composite machine 100. A user inputs setting conditions, and the like, in relation to the provided functions as described above, by using the operating unit 400. The user employs a touch panel 401, a touch pen 402 and operating keys 403 which are provided in the operating section 400 in order to input setting conditions or start the execution of a service.

(Card Reader)

Figure 5A:
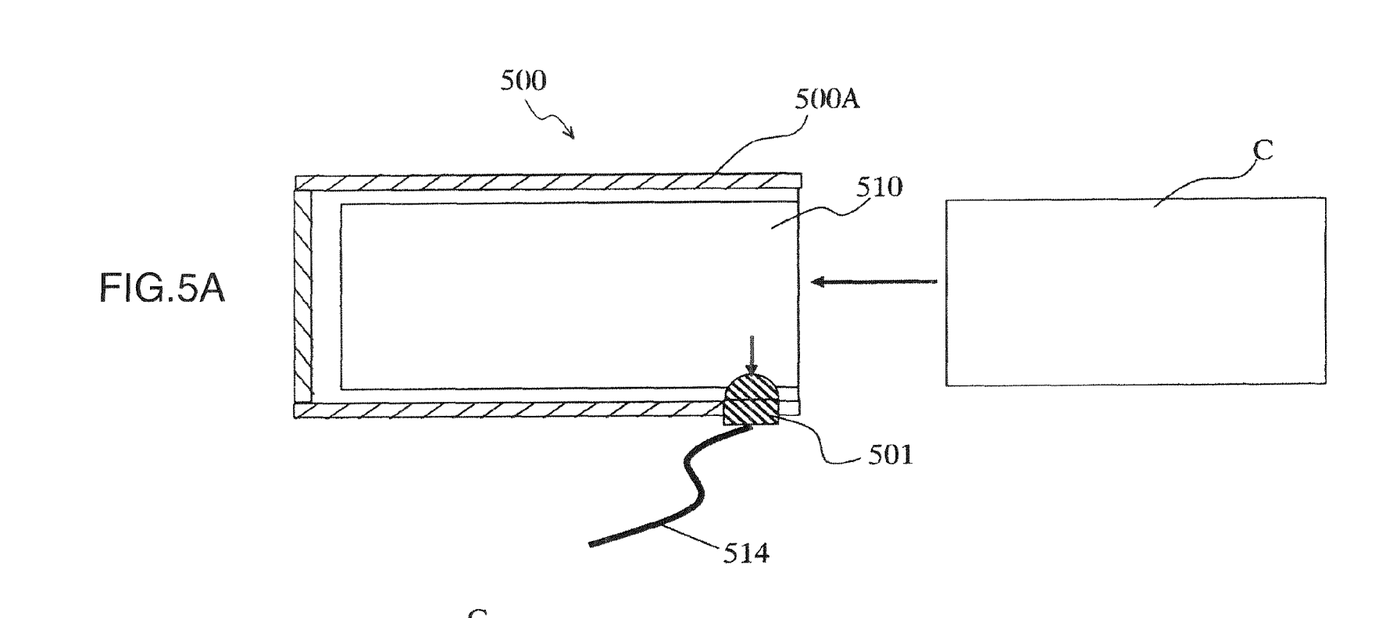
FIGS. 5A and 5B are cross-sectional diagram of a card reader which is attached to an image forming apparatus.

Next, the card reader 500 relating to the present embodiment will be described with reference to FIG. 1 to FIG. 4 and FIGS. 5A and 5B and FIG. 6. FIG. 5A is a plan view cross-sectional diagram showing the structure of the card reader 500 and a detection unit 501, FIG. 5B is a side view cross-sectional diagram of the same structure, and FIG. 6 is a functional block diagram of the composite machine 100.

The composite machine 100 has a USB port 51 (second interface) and the card reader 500 is connected from a USB terminal 505 (first interface) provided in the card reader 500 to a power supply unit 609 of the composite machine 100, by means of a USB cable 52 (transmission cable) and USB port 51. The power for operating the card reader 500 is supplied from the power supply unit 609 via a power line contained in the USB cable 52.

The card reader 500 may be situated in any desired location, provided that it is connected to the composite machine 100 by USB. Although not shown in detail in FIG. 1, in the present embodiment, a USB port 51 is provided at a position above the paper output tray 130 and below the reading unit 110 in the main body 101, and this USB port 51 and the USB terminal 505 of the card reader 500 are connected by USB via a USB cable 52.

Figure 5B:
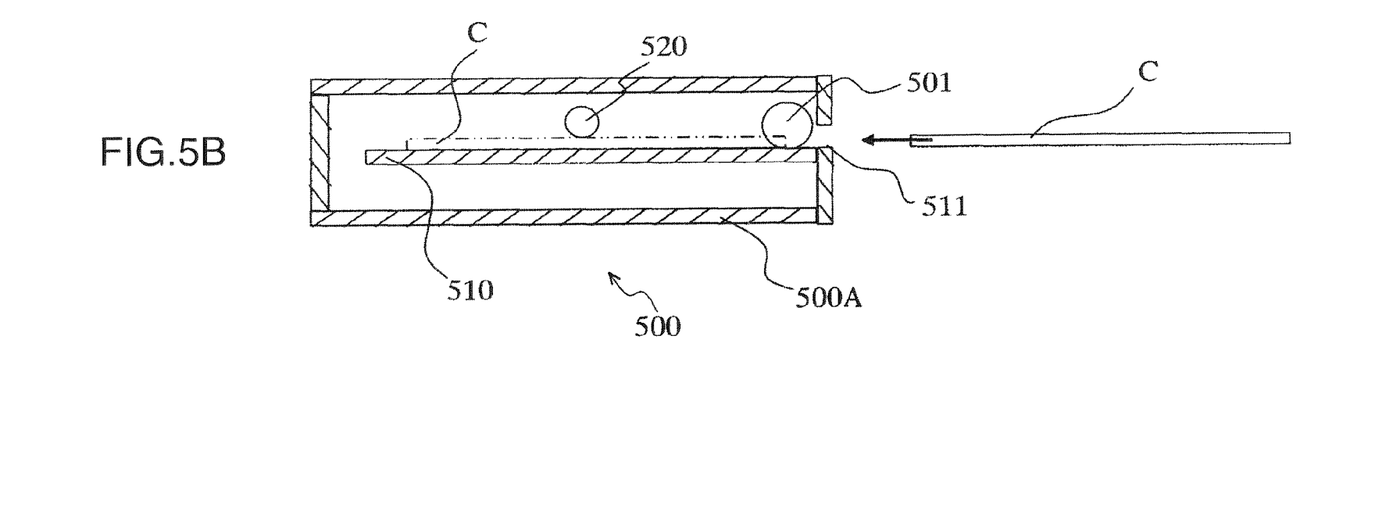
Figure 6:
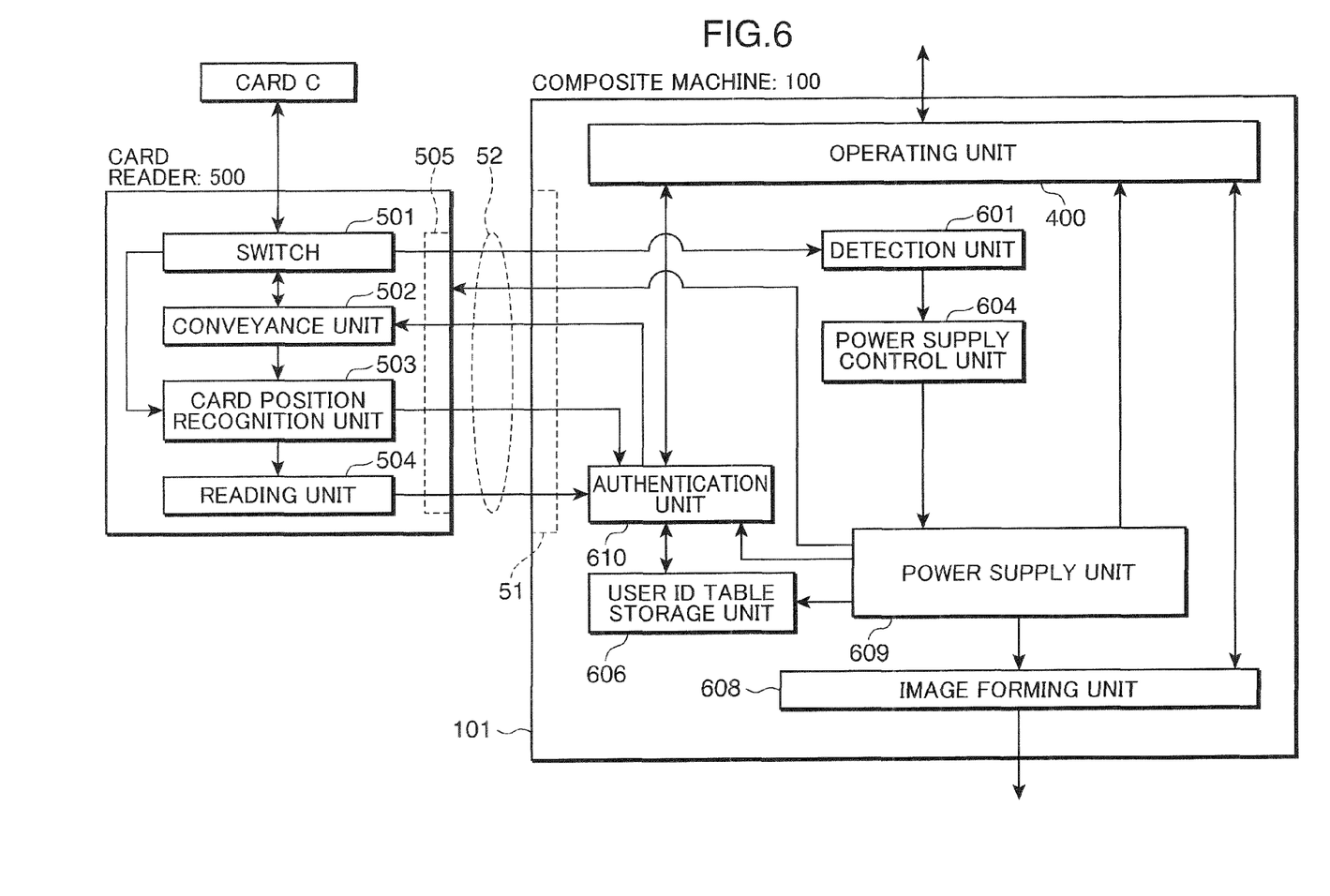
FIG. 6 is a functional block diagram of the image forming apparatus.

As shown in FIG. 5A and FIG. 5B, the card reader 500 includes a rectangular main case 500A made of resin, or the like, and provided inside this main case 500A, a card insertion slot 511 into which a card C, such as an IC card or a magnetic card, is inserted and from which the card is ejected, a card accommodating section 510, and a card conveyance roller 520.

The card accommodating section 510 connects with the insertion slot 511 on the front side of the card accommodating section 510. A switch 501 which performs a functional on and off switching operation is provided at a position near the insertion slot 511, which interferes with a card C which is inserted. The switch 501 is electrically connected by a signal line 514 to the detection unit 601 described hereinafter, and an ON signal (detection signal) is sent to the detection unit 601 when a card C interferes with same. The card conveyance roller 520 is a roller capable of forward and reverse rotation, which conveys the card C inserted via the insertion slot 511 to a prescribed position in the card accommodating section 510, and also conveys the card C in reverse toward the insertion slot 511 when ejecting the card C.

As shown in FIG. 5A, the switch 501 changes to an ON (closed) state when the switch is pushed in the lateral direction indicated by the arrow in FIG. 5A (a direction perpendicular to the direction of insertion) due to interference with a card C which is being inserted. On the other hand, when the card C is removed or when the interference ceases due to the card C being installed in a prescribed position, then the switch 501 changes to an OFF (open) state.

In addition to the switch 501 described above, as shown in FIG. 6, the card reader 500 also functionally includes a conveyance unit 502, a card position recognition unit 503 and a reading unit 504.

When the switch 501 changes to an ON state due to a card C being inserted into the card reader 500, it sends an ON signal to the detection unit 601. Upon receiving this ON signal, the detection unit 601 detects that a card C has been inserted into the card reader 500. When the card C reaches a state of having been fully inserted inside the card accommodating section 510, the switch 501 changes to an OFF state. Furthermore, when the card C is removed from the card reader 500, the switch 501 changes to an ON state temporarily. The detection unit 601 detects that the card C has been removed from the card reader 500 on the basis of this ON signal followed by a subsequent OFF signal.

The conveyance unit 502 conveys the card C in order to insert the card C into the card reader 500 and eject the card C from the card reader 500, and the conveyance unit 502 includes the card conveyance roller 520 described above and a driving mechanism, such as motor and gear, and the like, which drive this roller 520.

The card position recognition unit 503 includes of a reflective optical sensor, or the like, and detects whether or not a card C is disposed at a prescribed position in the card reader 500, in other words, a position for reading the information carried on the card C.

The reading unit 504 reads out information (a user ID) which is carried on the card C, and sends this information to an authentication unit 610 of the composite machine 100. If the card C is a magnetic card, then the reading unit 504 is a magnetic reader. If the card C is an IC card, then the reading unit 504 is a reader/writer capable of wireless communications with the IC card. Furthermore, if information is carried on the card C by a barcode, or the like, then the reading unit 504 is an optical reader.

The composite machine 100 includes, in relation to the card reader 500 described above, a detection unit 601, a power supply control unit 604, a power supply unit 609, an image forming unit 608, an user ID table storage unit 606 and an authentication unit 610. When a card C is inserted into the card reader 500, these functional units serve to supply power to the card reader 500 and to transfer the main unit of the composite machine 100 (image forming unit 608), which is in a sleep state, to an active state where normal operation is possible. Here, a sleep state means a mode where the main power supply is on, but the power supply to the main portions of the composite machine 100 is halted, thereby restricting power consumption.

The detection unit 601 judges an inserted state of the card C into the card reader 500 upon receiving an ON signal output from the switch 501 of the card reader 500. As described above, the switch 501 outputs an ON signal temporarily when the card C is inserted, and if this ON signal is received in the sleep state, then the detection unit 601 judges that the card C is in an "inserted state". On the other hand, since the switch 501 outputs an ON signal temporarily when the card C is inserted, then if an ON signal is received temporarily in the "inserted state" and then the ON signal ceases to be received, the detection unit 601 judges that the card C is in a "not inserted state".

The power supply control unit 604 (control unit) controls the power supply unit 609, and when the detection unit 601 has judged the "inserted state" described above, the power supply control unit 604 causes the power supply unit 609 to start the supply of power to the card reader 500 which is in an unpowered state, and the principal parts of the image forming unit 608, which are in a sleep state. On the other hand, if the detection unit 601 has judged the "not inserted state" described above, then the power supply control unit 604 shuts off the supply of power from the power supply unit 609. By this means, the card reader 500 is transferred to an unpowered state, and the image forming unit 608 is transferred from an active state to a sleep state.

The power supply unit 609 is a power supply apparatus capable of supplying power to the respective units of the composite machine 100, and includes respective switching circuits for switching the power supply on or off to the power supply paths to the respective units. These switching circuits include circuits for the card reader 500, for an active state, and for a sleep state, and are respectively controlled by the power supply control unit 604.

The image forming unit 608 includes a print unit 120 and a fixing apparatus 127 as shown in FIG. 1, and carries out image formation processing onto paper. The image forming unit 608 includes electrical devices which consume a relatively large amount of power, such as motors and solenoids which drive the various rollers and driven components, or heaters, light sources, and the like, as well as members which consume relatively little power, such as control circuit boards.

The user ID table storage unit 606 stores a user ID table stating a list of user IDs which are permitted access to the composite machine 100.

The authentication unit 610 carries out user authentication processing, by comparing the user ID stated on the card C with the user ID table stored in the user ID table storage unit 606. This authentication processing judges whether or not the user ID on the card C read out by the reading unit 504 of the card reader 500 is present in the user ID table. If the user ID is present in the user ID table and user authentication is successful, then the authentication unit 610 transfers to a state where various operations can be performed with respect to the composite machine 100 via the operating unit 400.

The overall operation of the composite machine 100 having the composition described above is as follows. In a state where a card C is not inserted in the card reader 500, the composite machine 100 is in a sleep state. When the switch 501 is switched on by inserting a card C into the card reader 500, the switch 501 sends an ON signal to the detection unit 601 and the detection unit 601 detects the insertion of the card C. Upon receiving this detection operation, the power supply control unit 604 starts the supply of power from the power supply unit 609 to the card reader 500, and sets the card reader 500 to a state where power is supplied via the USB cable 52 (powered state). Thereupon, the composite machine 100 transfers to an active state in which a copying service can be provided, by passing through the "process of returning from sleep state" described hereinafter, which includes user authentication. When the card C is ejected from the card reader 500, the composite machine 100 returns to a sleep state.

As a modified embodiment, it is possible to adopt a composition in which the detection unit 601 is set to a standby state when in a sleep state, and when the switch 501 turns on due to the card C being inserted into the card reader 500, the detection unit 601 which is in a standby state is started up and detects the insertion of the card C.

(Processing of Returning from Sleep State)

Figure 7:
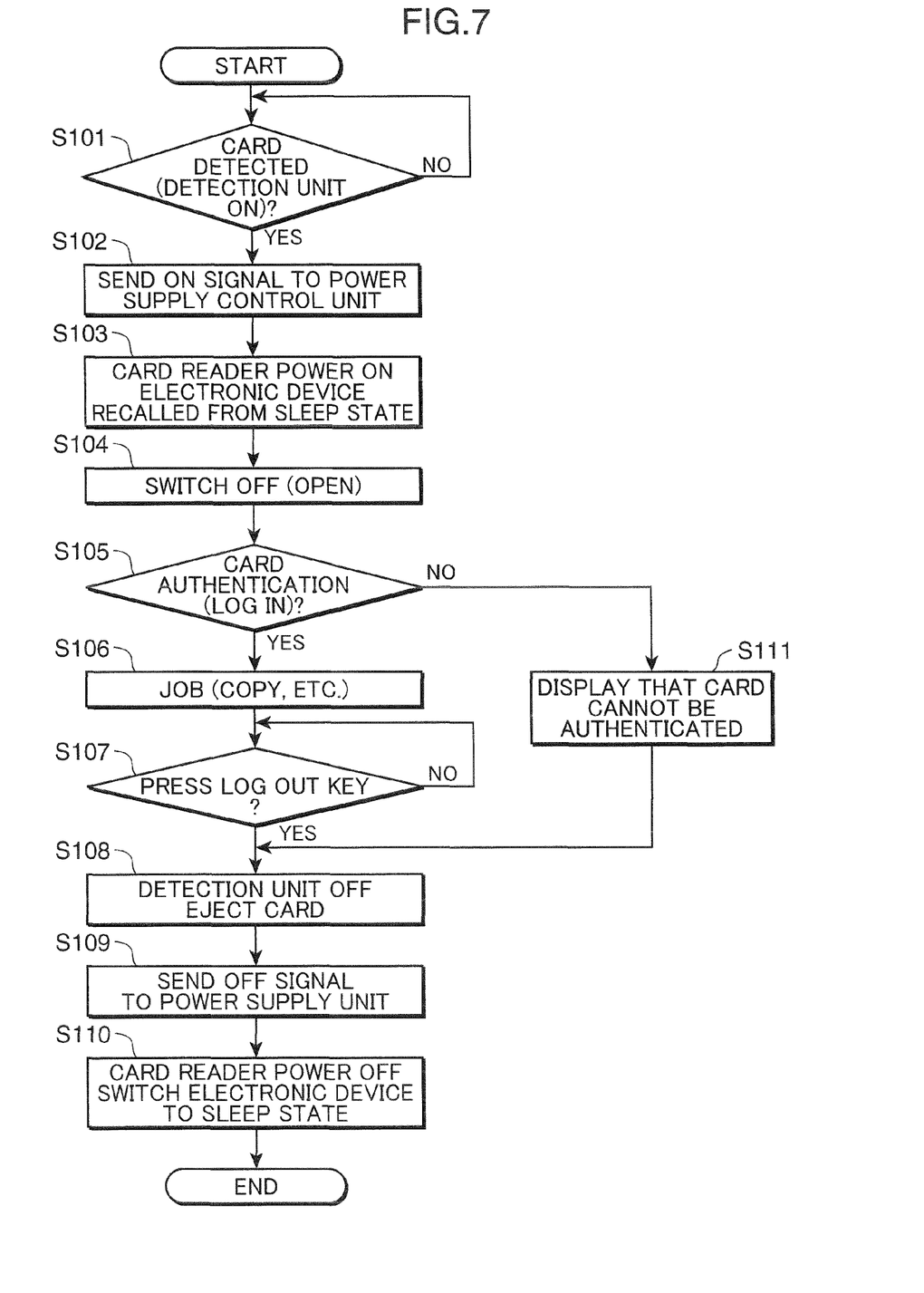
FIG. 7 is a flowchart showing processing of returning from a sleep state in an image forming apparatus.

Next, the processing for returning the composite machine 100 from a sleep state will now be described with reference to FIG. 1 to FIG. 6 and FIG. 7 which were explained above. FIG. 7 is a flowchart showing the processing for returning the composite machine 100 from a sleep state.

As stated above, the composite machine 100 according to the present embodiment authenticates the user on the basis of the user ID stored on the card C and a user ID table which is stored in the user ID table storage unit 606, and when a copying job, or the like has been completed, the card C is returned and the user authentication is cancelled. Here, the authentication of the user is called log in and the cancellation of user authentication is called log out.

If the card C is not inserted into the card reader 500, then the power supply to the respective units of the composite machine 100 from the power supply unit 609 of the composite machine 100 is partially shut off by the power supply control unit 604, thereby setting a state where the power consumption is restricted. The supply of power to the card reader 500 via the USB cable is shut off (sleep state). In this sleep state, a relatively small amount of power sufficient to drive the circuit boards, such as the CPU, is supplied, but power for driving the drive units, such as the motor, is shut off (NO at step S101).

If the user inserts a card C into the card reader 500 of the composite machine 100 which is in a sleep state, the switch 501 in the card reader 500 is switched on by interference with the card C. Accordingly, an ON signal is sent to the detection unit 601 of the composite machine 100 from the switch 501 and the detection unit 601 detects the insertion of a card C (YES at step S101). The detection unit 601 which has detected the insertion of the card C informs this fact to the power supply control unit 604.

Upon receiving this information, the power supply control unit 604 instructs the power supply unit 609 to supply power to the card reader 500. Upon receiving this instruction, the power supply unit 609 starts to supply power to the card reader 500. In other words, power is supplied to the card reader 500 from the power supply unit 609 via the USB cable 52, the card reader 500 assumes a powered state, and the conveyance unit 502, the card position recognition unit 503 and the reading unit 504 of the card reader 500 are started up.

Moreover, the power supply control unit 604 switches the operational state of the composite machine 100 from a sleep state to a state where functions can be provided. In other words, the supply of power from the power supply unit 609 is started and power is supplied to the principal parts of the composite machine 100, such as the image forming unit 608 (the drive unit, such as a motor). A state where power has been supplied from the power supply unit 609 to the principal parts of the composite machine 100 is called an "active state". In this active state, the composite machine 100 becomes able to provide functions, the authentication unit 610 and the user ID table storage unit 606 are also started up, and the operating unit 400 assumes an operable state (step S102→step S103).

Upon receiving the supply of power from the power supply unit 609, the conveyance unit 502 provided in the card reader 500 inserts the card C fully into the card accommodating section 510, and the switch 501 turns off (open) (step S104).

If a card C is inserted fully into the card accommodating section 510 of the card reader 500 and the switch 501 turns off (open), then the card position recognition unit 503 recognizes whether or not the card C is disposed in a prescribed position. If the card position recognition unit 503 recognizes this, then a information to this effect is sent to the authentication unit 610. Upon receiving this information, the authentication unit 610 authenticates the user on the basis of the user ID stored on the card C, and the user ID table stored in the user ID table storage unit 606 (step S105).

In the authentication process, firstly, the reading unit 504 of the card reader 500 acquires the user ID stored on the inserted card C, and reports the acquired user ID to the authentication unit 610. If the authentication unit 610 judges that the user ID described above matches a user ID in the user ID table (not illustrated) stored in the user ID table storage unit 606, then the authentication unit 610 authenticates the user (YES at step S105). Apart from using a user ID, it is also possible to employ a composition in which a user is required to enter a password via the operating unit 400, this password is acquired by the authentication unit 610, and the user is authenticated if it is judged that the acquired password matches a password stored in the storage unit 606.

If the user has been authenticated (log in) as described above, the user is able to perform an operation (job) such as copying (step S106). When the image forming unit 608 ends a processing operation (job), such as copying, and the user presses a log out key 410 of the operating unit 400, then the authentication unit 610 accepts log out (YES at step S107). If the log out key 410 is not pressed, then the log in state is continued (NO at step S107).

When the authentication unit 610 receives a log out, the authentication unit 610 outputs an instruction signal which causes the conveyance unit 502 of the card reader 500 to eject the card C. Upon receiving this instruction, the conveyance unit 502 ejects the card C. In this case, the switch 501 changes to an ON state due to being pushed by the card C, in the reverse sequence to that when the card C is inserted. Thereupon, the user pulls out the card C and the switch 501 turns off. Upon receiving the operation of the switch 501, the detection unit 601 detects the ejection of the card C (step S108).

When the ejection of the card C is detected, the detection unit 601 sends a information indicating that the card C has been ejected, to the power supply control unit 604. Upon receiving this, the power supply control unit 604 instructs the power supply unit 609 to shut off the supply of power to the card reader 500. Upon receiving this instruction, the power supply unit 609 shuts off the supply of power to the card reader 500. Moreover, the operational state of the composite machine 100 is switched from an active state to a sleep state, by means of the detection unit 601 causing the power supply control unit 604 to partially shut off the supply of power to the respective drive units of the composite machine 100 by the power supply unit 609 (step S109→step S110).

On the other hand, if the card C cannot be authenticated at step S105 above, then a display indicating that the card C cannot be authenticated is shown on the touch panel of the operating section 400 and the composite machine 100 is switched to a sleep state. For example, if the card C is a fraudulent card, then the conveyance unit 502 ejects the card C. Similarly to the foregoing, the power supply control unit 604 shuts off the supply of power from the power supply unit 609 to the card reader 500, and furthermore, the power supply control unit 604 partially shuts off the supply of power from the power supply unit 609 to the composite machine 100 and then terminates processing (NO at step S105→step S111).

Modified Embodiments

It is also possible to adopt a composition in which, after the authentication unit 610 has authenticated the user, job information corresponding to the job (copying, or the like) to be carried out by the image forming unit 608 is written to the card C. For example, the steps such as the following can be carried out.

In step S106 described above, if the user input settings conditions and then presses the start key 405, the image forming unit 608 starts a job, such as copying. Moreover, when the start key 405 is pressed, a calculation unit (for example, the CPU 301 in FIG. 3) provided in the composite machine 100 is started up and job information, such as the number of copies, charge, and the like, corresponding to the job, is calculated.

Next, at step S107 described above, if the image forming unit 608 has finished the copying or other operation (job), and the user has pressed the log out key 410 on the operating section 400, then the authentication unit 610 receives this log out and reports to the calculation unit that the job has finished. Upon receiving this report, the calculation unit reports the calculated job information to a writing unit (not illustrated) which is provided inside the card reader 500, and upon receiving this report, the writing unit writes the job information to the card C.

When the job unit has written job information to the card C as described above, at step S108 the writing unit issues an instruction for ejecting the card C to the card conveyance roller 502. The remainder of the description is the same as that given above and is therefore omitted here.

Figure 8:
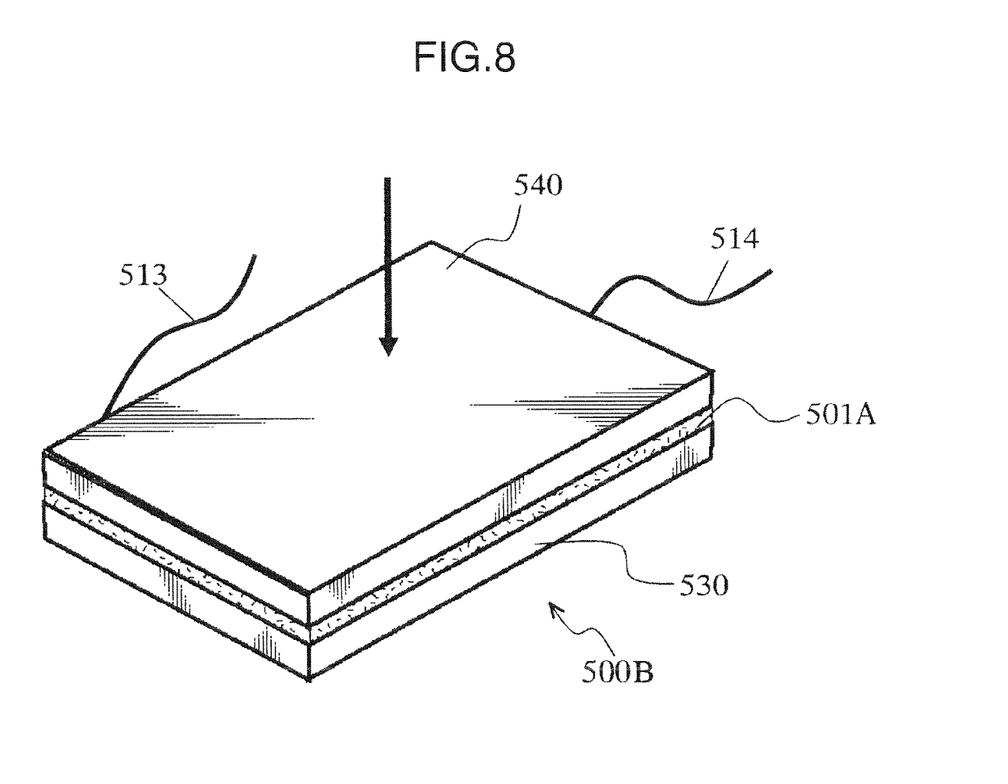
FIG. 8 is a drawing showing a further embodiment of the card reader.

As a further embodiment of the card reader 500, it is possible to use a card reader 500B composed in such a manner that a piezoelectric element 501A performing the role of the switch 501 described above is interposed between a lower plate member 530 and an upper plate member 540, as shown in FIG. 8. The lower plate member 530 is fixed to the composite machine 100, and a reading unit 504 is provided on the upper plate member 540. When the upper base member 540 is pushed by a card C, the piezoelectric element 501A receives an external force from the upper base member 540 and the lower base member 530, and generates a voltage. The arrows in the diagram indicate the state of pushing the upper base member 540 due to the card C making contact with the card reader 500 described above.

In this case, the piezoelectric element 501A sends an ON signal to the detection unit 601 only when pressed by the card C. Thereupon, similarly to the foregoing, the composite machine 100 is recalled from a sleep state and the card reader is set to a powered state. Subsequently, the reading unit 504 provided in the upper base member 540 acquires the user ID stored on the card C, and the authentication unit 610 in the composite machine 100 authenticates the user (performs log in) on the basis of this user ID and the user ID table stored in the user ID table storage unit 606.

When logging out, firstly, the authentication unit 610 accepts a log out operation when the user presses the log out key 410 provided on the operating unit 400, or when a prescribed period of time or longer has elapsed without a copying job, or the like, being performed. Next, the authentication unit 610 reports the log out to the power supply control unit 604. Upon receiving this, the power supply control unit 604 stops the supply of power from the power supply unit 609 and the composite machine 100 is switched from an active state to a sleep state.

According to the present embodiment, the composite machine 100 (electronic device) can be set to a sleep state when the power to the card reader 500 has been shut off. Moreover, when the card reader 500 is used, the composite machine 100 is recalled from the sleep state and power can be supplied to the card reader 500. Consequently, it is possible to reduce power consumption by at least an amount corresponding to the power supplied to the card reader 500 via the USB cable 52 (approximately 50 mA).

The present invention described above may be applied to various types of electronic devices which are capable of supplying power to a card reader, apart from an image forming apparatus such as the composite machine 100. In any electrical device, when the card reader is not being used, the electrical device can be set to a sleep state, with the power supply from the power supply to the card reader via the USB connection in a disconnected state.

The concrete embodiments described above principally comprise inventions having the compositions described below.

The electronic device relating to one aspect of the present invention includes:
 a card reader into which a card is inserted and which reads out information carried on the card;
 a power supply unit which supplies power to the card reader;

a detection unit which detects the insertion of a card into the card reader and the ejection of a card from the card reader; and a control unit which controls the power supply unit; the control unit causing the power supply unit to start the supply of power to the card reader when the detection unit detects the insertion of a card, and causing the power supply unit to shut off the supply of power to the card reader when the detection unit detects the ejection of the inserted card.

According to the present embodiment, the electronic device can be set to a sleep state when the power to the card reader has been shut off. Moreover, when the card reader is used, the electronic device is recalled from the sleep state and power can be supplied to the card reader. Consequently, it is possible to restrict the power consumed by the card reader.

In the aforementioned composition, desirably, the control unit:

switches the electronic device from a sleep state in which power consumption is restricted to an active state in which functions of the electronic device can be provided, when the detection unit detects the insertion of a card to the card reader; and switches the electronic device from the active state to the sleep state when the detection unit detects the ejection of the inserted card.

According to this composition, when insertion of a card is detected, it is possible to switch the state of the electronic device itself, and therefore the power consumption can be restricted yet further.

Desirably, the composition described above further includes:

a main body in which at least the power supply unit and the control unit are housed;

a first interface provided in the card reader;

a second interface provided in the main body; and a transmission cable which connects the first interface and the second interface;

wherein the supply of power from the power supply unit to the card reader is performed by using a power line included in the transmission cable.

According to this composition, power supply to the card reader can be achieved by using the transmission cable which connects the card reader with the main body. According to a composition having an independent power supply path of this kind, it is possible to simplify the circuit composition, and the like, for starting and halting the supply of power to the card reader.

In this case, it is possible to adopt a composition which further includes:

a switch which is disposed in the card reader and outputs a detection signal upon interference with an inserted card;

wherein the detection unit is disposed in the main body, is capable of receiving the detection signal via the transmission cable, and detects the insertion and ejection of the card on the basis of the detection signal. According to this composition, it is possible to detect the insertion of a card by means of a simple composition.

Moreover, it is also possible to adopt a composition which further includes:

a reading unit which is disposed in the card reader and reads out information carried on the card; and an authentication unit which is disposed in the main body and carries out an authentication operation on the basis of information read by the reading unit;

wherein power is supplied to the reading unit and the authentication unit when the detection unit detects the insertion of a card. According to this composition, it is possible to reduce power consumption in the functional parts for reading and authenticating card information.

One desirable embodiment is one where the electronic device in the composition described above is an image forming apparatus which forms images on paper.

The method of supplying power to a card reader relating to a further aspect of the present invention is a method of supplying power to a card reader which receives the insertion of a card and reads out information carried on the card, including the steps of:

waiting for the detection of an operation of inserting a card into the card reader, in a state where a card has not been inserted into the card reader;

causing a power supply unit which supplies power to the card reader to start the supply of power to the card reader, when the insertion of a card into the card reader is detected;

waiting for the detection of an operation of ejecting the card from the card reader, in a state where the card has been inserted into the card reader; and stopping the supply of power to the card reader by the power supply unit when the ejection of the card from the card reader is detected. This application is based on Japanese Patent Application Serial No. 2009-023789, filed in Japan Patent Office on Feb. 4, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electronic device, comprising:
a card reader into which a card is inserted and which reads out information carried on the card;
a power supply unit which supplies power to the card reader;
a detection unit which detects insertion of a card into the card reader and ejection of a card from the card reader;
a control unit which controls the power supply unit;
a main body in which at least the power supply unit and the control unit are housed;
a first interface provided in the card reader;
a second interface provided in the main body; and
a transmission cable which connects the first interface and the second interface;
wherein the supply of power from the power supply unit to the card reader is performed by using a power line included in the transmission cable; and
wherein the control unit:
causes the power supply unit to start a supply of power to the card reader when the detection unit detects the insertion of a card; and
causes the power supply unit to shut off the supply of power to the card reader when the detection unit detects the ejection of the inserted card.

2. The electronic device according to claim 1, wherein the control unit:
switches the electronic device from a sleep state in which power consumption is restricted to an active state in which functions of the electronic device can be provided, when the detection unit detects the insertion of a card to the card reader; and switches the electronic device from the active state to the sleep state when the detection unit detects the ejection of the inserted card.

3. The electronic device according to claim 1, further comprising:
a switch which is disposed in the card reader and outputs a detection signal upon interference with an inserted card;
wherein the detection unit is disposed in the main body, is capable of receiving the detection signal via the transmission cable, and detects the insertion and ejection of the card on the basis of the detection signal.

4. The electronic device according to claim 3, wherein the switch is disposed in the card reader in a position so that the inserted card reaches a state of having been fully inserted and the switch terminates the detection signal, thereby indicating the card reaching the state of having bent fully inserted.

5. The electronic device according to claim 4, further comprising a card position recognition unit that detects whether the card is in a position in the card reader for reading information carried on the card.

6. The electronic device according to claim 5, wherein the card position recognition unit comprises a reflective optical sensor.

7. The electronic device according to claim 1, further comprising:
a reading unit which is disposed in the card reader and reads out information carried on the card; and
an authentication unit which is disposed in the main body and carries out an authentication operation on the basis of information read by the reading unit;
wherein power is supplied to the reading unit and the authentication unit when the detection unit detects the insertion of a card.

8. The electronic device according to claim 1, wherein the main body is an image forming apparatus which forms an image on paper.

9. An electronic device, comprising:
a main body;
a card reader into which a card is inserted and which reads out information carried on the card;
a power supply unit that supplies power to the card reader, the power supply unit being housed in the main body;
a cable for power supply connecting the power supply unit and the card reader;
a detection unit that detects insertion of a card into the card reader and ejection of a card from the card reader; and
a control unit that controls the power supply unit, wherein the control unit; causes the power supply unit to start a supply of power to the card reader through the cable, and switches the main body from a sleep state in which power consumption is restricted to an active state in which functions of the main body can be provided when the detection unit detects the insertion of a card to the card reader, and wherein the control unit further causes the power supply unit to shut off the supply of power to the card reader through the cable, and switches the main body from the active state to the sleep state when the detection unit detects the ejection of the inserted card.

10. The electronic device according to claim 9, wherein the main body is an image forming apparatus that forms an image on paper.

11. An electronic device, comprising:
a main body;
a card reader into which a card is inserted and that reads out information carried on the card;
a power supply unit housed in the main body, the power supply unit supplying power to the card reader;
a switch disposed in the card reader and outputting a detection signal upon interference with an inserted card;
a first cable for communications connected with the switch;
a detection unit housed in the main body and connected with the first cable, the detection unit detecting the detection signal indicative of insertion of a card into the card reader or ejection of a card from the card reader;
a second cable for power supply, the second cable connecting the power supply unit and the card reader; and
a control unit housed in the main body and controlling the power supply unit, wherein the control unit causes the power supply unit to start a supply of power to the card reader through the second cable based on the detection signal transmitted through the first cable when the detection unit detects the insertion of a card to the card reader, and wherein the control unit further causes the power supply unit to shut off the supply of power to the card reader through the second cable based on the detection signal transmitted through the first cable when the detection unit detects the ejection of the inserted card.

12. The electronic device according to claim 11, wherein the main body is an image forming apparatus that forms an image on paper.

13. The electronic device according to claim 11, wherein the switch is disposed in the card reader in a position so that the switch terminates the detection signal when the inserted card reaches a state of having been fully inserted, thereby indicating the card reaching the state of having bent fully inserted.

14. The electronic device according to claim 13, further comprising a card position recognition unit that detects whether the card is in a position in the card reader for reading information carried on the card.

15. The electronic device according to claim 14, wherein the card position recognition unit comprises a reflective optical sensor.

* * * * *